C. S. HOMER.
Hoe.
No. 1,593. Patented May 8, 1840.
Fig. 1.
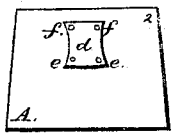
Fig. 2.
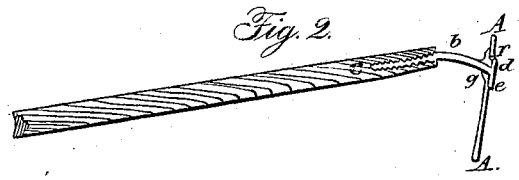
Fig. 3. Fig. 6.
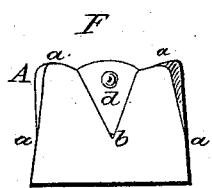 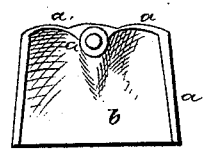
Fig. 4.
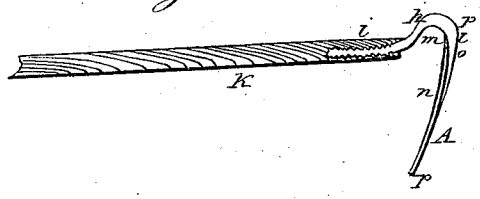
Fig. 5.
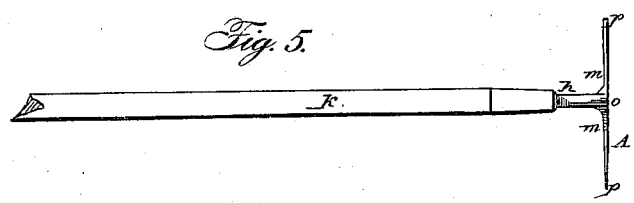

UNITED STATES PATENT OFFICE.

CHARLES S. HOMER, OF BOSTON, MASSACHUSETTS.

IMPROVEMENT IN THE MANNER OF CONSTRUCTING GARDEN-HOES.

Specification forming part of Letters Patent No. 1,593, dated May 8, 1840.

*To all whom it may concern:*

Be it known that I, CHARLES S. HOMER, of Boston, in the county of Suffolk and State of Massachusetts, have invented a new and useful Improvement in Garden-Hoes, of which the following is a specification.

These improvements, the principles thereof, and manner in which I have contemplated the application of the same, by which they may be distinguished from other inventions of a like character, together with such parts or combinations, I claim as my invention, and consider original and new, I have herein set forth and described, which description, taken in connection with the accompanying plate of drawings, herein referred to, composes my specification.

My improvements consist principally in the modes of attaching the plate and shank of a hoe to each other.

Many inventions have heretofore been made on this kind of agricultural implements, and although as a garden tool it is exceedingly simple, and seems as ordinarily constructed to approach as near perfection as possible, yet some slight or what is apparently a slight change in the mode of connection of the shank and plate may render it much more durable, effective, and useful, and be productive of highly beneficial results. I conceive this to be the case with my improvements, and if clearly examined they will be found to possess decided advantages over any other hoes.

Figures 1, 2, 3, 4, 5, 6, and 7 represent my methods of forming the shank and plate and securing them together.

A A, Figs. 1 and 2, is the plate, of cast-steel, shaped as seen in the drawings, or otherwise suitably formed. The shank $b$, Fig. 2, has a screw, $c$, on one end, which, on being screwed into the end of the handle B, confines the shank in the said handle. On the other end of the shank there is a stout rectangular or square head, $d$, whose external sides or edges are beveled or chamfered down, as seen in Figs 1 and 2. When the shank is passed through the plate the other or internal side of the head fits closely against the plane surface of the plate, to which it is firmly secured by four or more strong rivets, $e\ f\ e\ f$. A washer, $g$, Fig. 2, is heated to redness and driven on the shank $b$ close up or against the opposite side of the plate, and when this washer cools it shrinks to such a degree as to set firmly and tightly on the shank and up to the plate. The washer $g$, being thus applied to the shank, serves as a shoulder to support the plate and relieve the strain on the rivets. Now, when any pressure is exerted against the lower side or edge of the plate it is mostly borne by the lower part of the head of the shank. Were this head of a triangular shape, as are those of ordinary construction, there would be a tendency both to crack the plate vertically and to press up the point or lower part of the head and loosen it from the plate, and the roots and earth collecting between the same would soon render the implement useless, whereas by the square shape and extended surface of the head this evil is effectually remedied and the strength of the entire plate greatly enhanced.

Another improvement is represented in Figs. 3, 4, and 5 of the accompanying plate of drawings, where $h$ is the shank, with a screw, $i$, on one end, arranged with the handle $k$ as above described in my first-mentioned improvement. The head $l$ of the shank of this hoe is triangular, as usual, and that part $m\ m$ of the plate A to which it is attached is hollowed in or pressed back so as to form a triangular cavity to receive the head $l$ of the shank, the same being fastened in the usual manner by any suitable number of rivets $x\ x$. By this arrangement it will be seen that the front of the hoe presents a plane smooth surface, and the destructive effects which accrue from the collection of roots and earth between the head and plate are entirely avoided. The angular or lower point of the head $l$ should be sunk rather below the surface of the plate, so that no fibers or small roots can be caught between it and the plate. Where a head is riveted to a plate with a flush or plane surface, so as to project beyond the same, as these parts of the hoe are ordinarily constructed or put together, any considerable force acting on the plate has a tendency to spring the same away from this part of the shank applied thereto, thus slightly opening the joint and admitting small earthy or gravelly particles to insinuate themselves therein. As this operation is often likely to occur, the natural tendency in a short time is to loosen the rivets, and thus destroy the connection of the plate and shank to each other. The cast-steel hoe-plates thus constructed are formed by a similar apparatus to that usually adopted to press out and give the requisite shape to shovels, and a corresponding die is used to form the rear of the head of the shank. Thus when the latter is applied to the sunken plate the two surfaces exactly coincide with each other, and when riveted together form a close and perfect joint.

Figs. 6 and 7 represent another of my improvements, in which it will be perceived that the edges $a\ a\ a$ of the plate are bent inward like those of a common shovel. The hoe being curved a little longitudinally gives to the plate thus formed a shape which, while it imparts to it much more stiffness and strength, at the same time renders it very convenient for gravelly or loose soils. The head $d$ is flush or even with the outer surface of the plate, as in Figs. 3, 4, 5. It is secured to the plate by rivets, and the shank passes through the plate and has a shoulder or ring, $e$, similar to $g$, Fig. 2, shrunk on it to strengthen its connection with the plate.

Having now described my improvements, I shall now point out such parts of the same as I consider new and claim to be my invention.

What I claim is—

The mode herein described of connecting the hoe plate and shank by forming the latter with a square head and riveting it to the outside of the blade, the shank having been passed through it, and passing an iron collar over the shank on the inside of the hoe-plate in the manner herein described, so as to confine the plate between said collar and the square head on the outside of it, by means of which arrangement I am enabled to give not only greater strength to the blade of the hoe, but to make the instrument more durable than hitherto constructed.

In testimony that the above is a true description of my said invention and improvements I have hereto set my signature this 21st day of February, in the year of our Lord 1840.

CHAS. S. HOMER.

Witnesses:
R. H. EDDY,
E. LINCOLN, Jr.